US008082872B2

(12) United States Patent
Cook et al.

(10) Patent No.: US 8,082,872 B2
(45) Date of Patent: Dec. 27, 2011

(54) DETECTABLE GUIDANCE MARKERS FOR TACTILE NAVIGATION, INCLUDING INDICIA OF OBSTACLE PRESENCE, TYPE, DIMENSIONS, DIRECTION, AND/OR PROXIMITY

(75) Inventors: Robert G. Cook, Springfield, OR (US); Patrick D. Boyd, Aloha, OR (US)

(73) Assignee: Navi-Tech, LLC, Springfield, OR (US)

( * ) Notice: Subject to any disclaimer, the term of this patent is extended or adjusted under 35 U.S.C. 154(b) by 130 days.

(21) Appl. No.: 12/454,048

(22) Filed: May 11, 2009

(65) Prior Publication Data

US 2009/0283026 A1 Nov. 19, 2009

Related U.S. Application Data

(60) Provisional application No. 61/127,743, filed on May 14, 2008.

(51) Int. Cl.
*G09B 21/00* (2006.01)
*E01F 9/00* (2006.01)

(52) U.S. Cl. ...................... 116/205; 116/DIG. 17; 404/9

(58) Field of Classification Search .................. 116/205, 116/63 R, 63 P, DIG. 15, DIG. 16, DIG. 17; 404/6, 9, 10, 12, 13, 15; 340/407.1; 434/112
See application file for complete search history.

(56) References Cited

U.S. PATENT DOCUMENTS

| | | | | |
|---|---|---|---|---|
| 4,080,087 | A * | 3/1978 | Phillips | 404/72 |
| 4,620,816 | A * | 11/1986 | Kupfer | 404/6 |
| 4,715,743 | A * | 12/1987 | Schmanski | 404/9 |
| 5,106,226 | A * | 4/1992 | Fanslow et al. | 404/15 |
| 5,302,049 | A * | 4/1994 | Schmanski | 404/42 |
| 5,328,293 | A * | 7/1994 | Keefe | 404/9 |
| 5,626,094 | A * | 5/1997 | Jeffery et al. | 116/205 |
| 6,025,773 | A * | 2/2000 | Bresnan | 340/407.1 |
| 6,499,421 | B1 * | 12/2002 | Honigsbaum | 116/205 |
| 6,964,244 | B2 * | 11/2005 | Stockton | 116/205 |
| 2004/0067336 | A1 * | 4/2004 | Munroe, II | 428/131 |
| 2006/0108426 | A1 | 5/2006 | Hopkins | |
| 2009/0032590 | A1 | 2/2009 | Hopkins | |

* cited by examiner

*Primary Examiner* — Amy Cohen Johnson
(74) *Attorney, Agent, or Firm* — James G Stewart, PC

(57) ABSTRACT

An apparatus, system, and method provides blind and vision impaired (B/VI) persons with improved Detectible Guidance Markers (DGMs) for navigation in a wide variety of environments, providing information regarding the presence, type, direction, and proximity of various navigational obstacles. A representative but non-exclusive example of an invented unitary DGM includes a plurality of tactually-detectable informational members, including a base member and one or more integral directional members configured to be disposed at a surface of a navigational substrate. A discrete number of directional members conveys an obstacle identity, while different lengths of directional members, and characteristics of other informational members, convey a direction and/or a proximity to an obstacle. Additionally, numerous structural alterations to a surrounding substrate surface cooperatively supplement the detectability and information-conveying benefits of a DGM.

19 Claims, 7 Drawing Sheets

DETECTABLE GUIDANCE MARKERS FOR TACTILE NAVIGATION, INCLUDING INDICIA OF OBSTACLE PRESENCE, TYPE, DIMENSIONS, DIRECTION, AND/OR PROXIMITY

RELATED APPLICATIONS

This application claims benefit of priority to provisional application No. 61/127,743, filed 14 May 2008 and entitled DETECTABLE GUIDANCE MARKERS FOR TACTILE NAVIGATION, INCLUDING INDICIA OF OBSTACLE PRESENCE, TYPE, DIMENSIONS, DIRECTION, AND PROXIMITY, the disclosures of which are hereby entirely incorporated herein by this reference.

BACKGROUND OF THE INVENTION

The invention relates generally to the field of navigational aid structures for blind and visually impaired (B/VI) persons. More particularly, the invention relates to environmentally-placed systems and devices for facilitating tactile navigation by B/VI persons within a structurally-varied environment.

Blind and visually impaired (B/VI) persons face substantial challenges navigating in complex environments, particularly in urban environments. This is largely due to the large number and variety of obstacles presented to them, and can be further complicated by the cacophony of noises which may be difficult to differentiate, locate, and identify. Examples of navigational obstacles include abrupt changes in the elevation of a walking surface (e.g., stairs, curbs, etc.), building entries, transit vehicle embarkation points (e.g., bus stops, train platforms, etc.), crosswalks, and others. Many types of obstacles are themselves a destination, and must be successfully located, navigated to, and transited in order to reach an intended destination.

Sighted persons can quickly and easily visually differentiate one type of obstacle from another, determine an approach direction to and distance from an obstacle, and successfully navigate throughout their physical environment relying almost solely on sight. For B/VI persons, however, tactile navigation is a critical method for self-guided navigation. Examples of tactile navigation include detecting surface mounted markers underfoot, feeling along elevated structures (e.g., walls, railings, etc.), or more commonly, using a cane or similar device to sweep an approach path and feel for the presence (and/or absence) of structural obstacles.

Numerous forms of tactile navigational aid structures and/or systems have been proposed and/or implemented. One example includes providing a plurality of raised bumps or linear segments arranged at a surface of a walking path, extending longitudinally along the path to continuously guide a B/VI person along the length of the path. As long as the person can feel the bumps underfoot, they know they are still approximately centered within the path. However, such linear pathway guides provide only a means and/or method to keep a person following a prescribed course, and generally do not provide information or guidance regarding surrounding obstacles, nor how to locate an entrance to the path in the first instance.

Another similar walking-surface-located guidance structure includes the commonly seen array of small domes, or ‘truncated’ domes, typically placed at or near an entry to a crosswalk. A B/VI person arriving at such an array can detect elevations (typically) present at the walking surface. However, the arrays are both overly complex, and insufficiently informative. The large number of individual bumps does not provide much information except to convey, for example, “You have arrived near an obstacle”. The B/VI person is left to discern the environment through various cues, such as listening for audible indications (e.g., presence of passing traffic, etc.) and/or searching for structural details in the environment to determine the nature of the obstacle, which direction to navigate, etc.

One concept, described in U.S. Pat. No. 6,964,244 (’244) entails a plurality of parallel, substantially identical longitudinally-elongated elevated structures forming a pattern. According to ’244, a pattern can include, for example, two identical parallel structures disposed at a surface of a walking path to indicate one type of obstacle, and three identical parallel structures to indicate another type of obstacle.

Additionally, the ’244 structures are typically arranged to longitudinally ‘point’ in a direction corresponding to a subsequent direction of travel so that a user will arrive at the obstacle so marked. While the ’244 concept does differentiate some types of obstacles from others, and provide some amount of directional guidance, it does not solve all problems of the prior art.

First, although the described patterns provide some directional information, they equally and simultaneously direct B/VI persons both toward an obstacle as well as 180-degrees away from the obstacle. The patterns tell a person to either go left or right along a longitudinal direction of the pattern structures, for example, but include no further indicia of which direction is proper.

Secondly, each structure within a pattern is identical to each other structure in the pattern, all of which are simply longitudinally-elongated stripes. As a logical consequence, each tactually-detectable portion of each structure is exactly like each other portion of the structure, as well as of each other structure. Therefore, the structures provide no integral indicia of proximity to an obstacle, and in particular, no progressive indicator(s) of proximity as a person more closely approaches an obstacle. Any sweep of a pattern of structures reveals the same as each prior sweep, leaving the user again to search for and rely upon extrinsic environmental cues (e.g., structures, sounds, etc.) to determine proximity to an obstacle. The unfortunate reality not comprehended by ’244 is that environmental cues are inconsistent throughout any environment in which a B/VI person attempts to navigate, and can vary at any single location from one particular time to another time (e.g., as objects are moved, types and volumes of sounds vary, etc.).

Further frustrating determination of proximity, beyond setting a minimum preferred length of the structure, ’244 provides no link between any particular length of the structure and any relationship to surrounding structures. Rather, ’244 requires (only) that the structure of a pattern be ‘substantially identical’.

Additionally, the ’244 patterns are self-contained, including no indicia at a surrounding walking surface to guide a B/VI person to the pattern. The ’244 patent entirely leaves detection of its patterns and guidance system to chance, and this omission in ’244 is not accidental. Rather, ’244 expressly and unambiguously requires that all areas of an underlying walking surface surrounding and extending from any of its described patterns remain entirely unaffected and unaltered by the guidance system. Of course, a person derives benefit from the ’244 patterns only after first being able to encounter and detect them.

Thus, numerous navigational challenges presented to B/VI persons each day remain unaddressed by, and in substantial ways further complicated by, the prior art.

DETAILED DESCRIPTION OF THE PREFERRED EMBODIMENTS

Figure 1A:
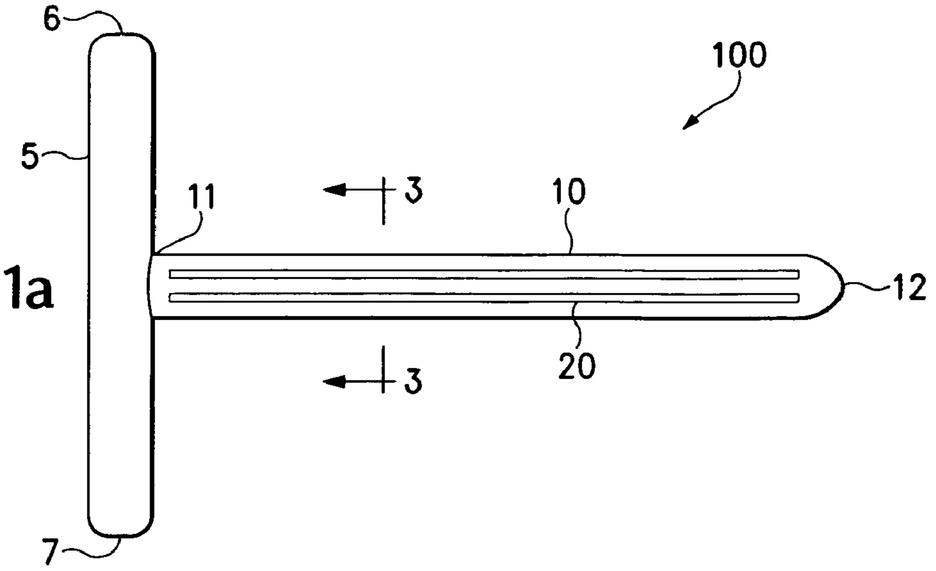
FIGS. 1*a-d* each depict a plan view of a Detectable Guidance Marker (DGM) according to an alternative embodiment of the invention.

Referring to FIG. 1*a*, an embodiment of a Detectable Guidance Marker (DGM) 100 typically includes a longitudinally elongated base member 5, and one or more additional longitudinally-elongated direction-indicating (directional) members 10 (collectively, 'informational members', or 'information-conveying members'). Each directional member 10 typically adjoins (integrally or otherwise) the base member 5 at a distal end 11 (relative to a marked navigational obstacle, or 'obstacle'), and extends approximately perpendicularly therefrom, terminating at a proximal end 12 (also relative to a marked obstacle). Proximal end 12 is rounded in a typical embodiment, but is not so limited, and can be tapered, squared, enlarged, or some other configuration. In one or more embodiments, base member 5 also includes one or more terminal ends 6/7, wherein either or both of terminal ends 6/7 are also rounded, tapered, squared, enlarged, etc. However, to reduce the possibility of confusion, terminal ends 6/7 of the base member 5 and the one or more proximal ends 12 of the directional member(s) may be shaped differently in at least one embodiment.

Figure 3:
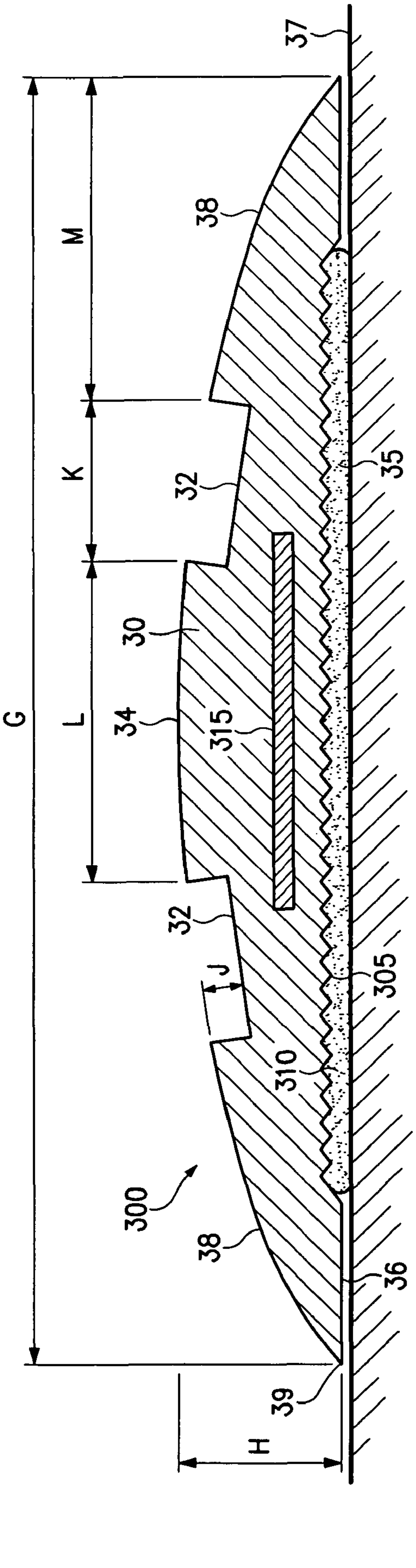
FIG. 3 depicts a sectional view of a directional member of a detectable guidance marker according to alternative embodiments of the invention.

Each of base member 5 and the one or more directional members 10 are configured to present an elevated ('tactually-detectable') profile above a surface of a 'navigational substrate', or simply 'substrate' herein (e.g., a sidewalk or other walking path, a platform, a street surface, an interior floor, etc.), at which the DGM 100 is coupled. Such elevated profile, or contour, described in more detail below relative to FIG. 3, is sufficiently elevated relative to a navigational substrate to be tactually detectable by a B/VI person when encountered by a foot, by hand, by a scanning cane, or by some other device or body part used by a B/VI person for navigation. However, the amount of said elevation is generally insufficient to present a substantial trip hazard, and other features in an embodiment of a DGM 100 further mitigate any risk for tripping perambulatory or other individuals, or otherwise constituting an impediment to continued, safe navigation.

Herein, 'navigational substrate' generally means any surface and/or material (whether underlying the person or disposed vertically—e.g., a wall, a sign, etc.) along which a person (e.g., a B/VI person or others) will travel and/or guide themselves while traveling in an environment, at which a DGM can be disposed, and relative to which a person can detect the disposed DGM using a hand, foot, cane, or another tactually-operative navigational aid. The term 'environment' (e.g., 'navigational environment', 'environmental cues', etc.) herein is inclusive rather than exclusive, and includes any location within or through which a B/VI or 'sighted' (non-B/VI) person may perambulate or otherwise navigate or be conveyed (such as by use of a wheel chair, etc.), whether indoors or outdoors, whether expansive or confining, and wherever situated.

Extending along a length of an exposed, user-detectable surface of one or both of a base member 5 and a directional member 10, are one or more detection-enhancing (also 'detectability-enhancing') features 20, generally configured as either or both of elevated features raised above a surrounding surface (whether such surface is generally flat, curvilinear, or otherwise) of the directional member 10, or recessed features recessed below a surrounding surface of the directional member 10. Detection-enhancing features 20 may not be present in all embodiments, but when present, they provide additional texture to either or both of the directional member (s) 10 and the base member 5, increasing their tactile detectability to a B/VI person.

Figure 1B:
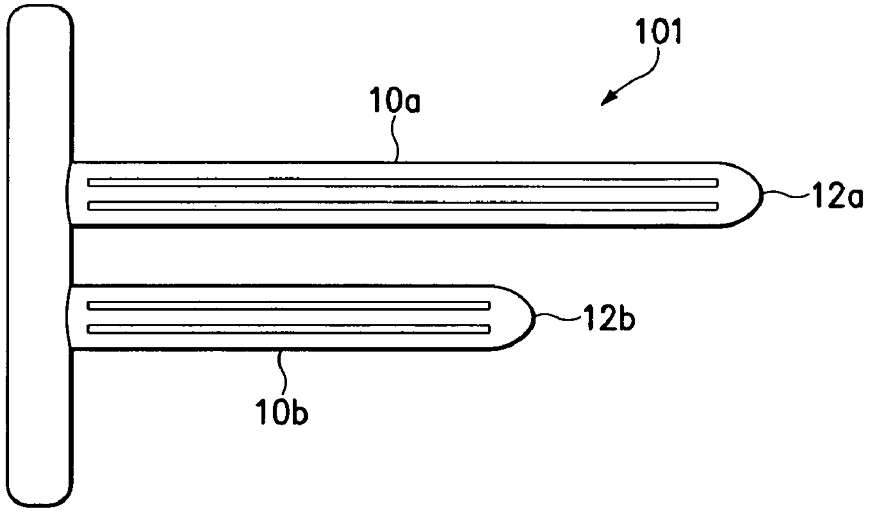

Referring to FIG. 1*b*, an embodiment of a DGM 101 having two or more directional members 10, includes at least one directional member 10*a* wherein the proximal end 12*a* extends a substantially greater distance (e.g., detectably and bearing informational significance) away from the base member 5 than does the proximal end 12*b* of at least one other directional member 10*b*. Typically, but not exclusively, the distance from the base member 5 of proximal end 12*a* will correspond to a first length of directional member 10*a*, and the distance from base member 5 of proximal end 12*b* will correspond to a second length of directional member 10*b*. Likewise, a difference in length between the first length and the second length will typically, although not exclusively, be a predetermined (according to an agreed upon/planned scheme for the structure and placement of obstacle marking indicia) and relatively uniform difference. By 'relatively uniform', it is meant that any variation from an otherwise uniform difference (e.g., due to wear, slight variations in manufacturing or construction, etc.) is either not detectable by a B/VI person, or is recognized as having no informational significance in the DGM.

Figure 1C:
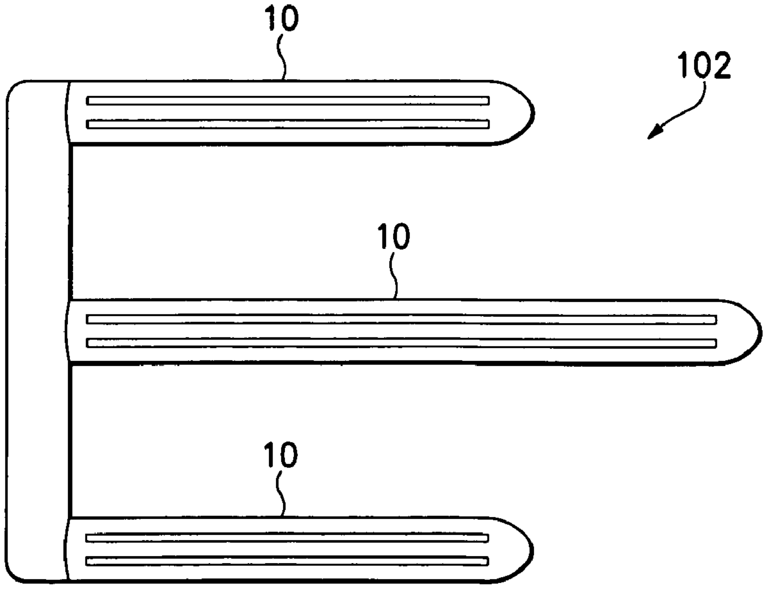
Figure 1D:
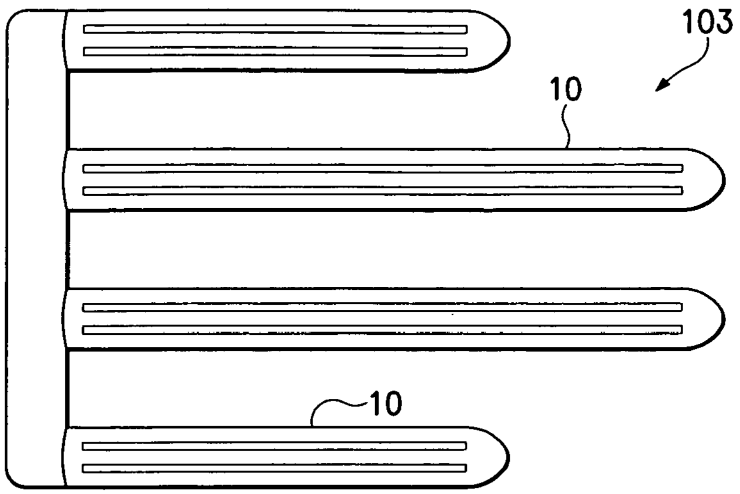

As shown by FIGS. 1*c* and 1*d*, alternative embodiments of the invention include a DGM 102/103 including either three/four directional members 10, respectively, although the embodiments are not so limited. Differing numbers of directional members provided in the embodiments of FIGS. 1*a-d*, for example, provide each DGM embodiment with unique indicia according to a predetermined scheme (e.g., as determined and/or promulgated by an individual, collective, municipal, regional, national, or other standard setting entity, whether public or private) for indicating and/or identifying different types of obstacles. For example, DGM 300, with its three easily detectable directional members, could be used consistently within a particular environment, or even in all environments, to identify transit stops (e.g., bus stops, train entry points from a platform, taxi stops, etc.), while DGM 400, with four directional members, could be consistently used to identify crosswalks and/or similar pedestrian ways. Therefore, a B/VI person detecting a particular number of directional members 10 will easily recognize the type of obstacle marked by and proximate to the DGM.

Figure 2A:
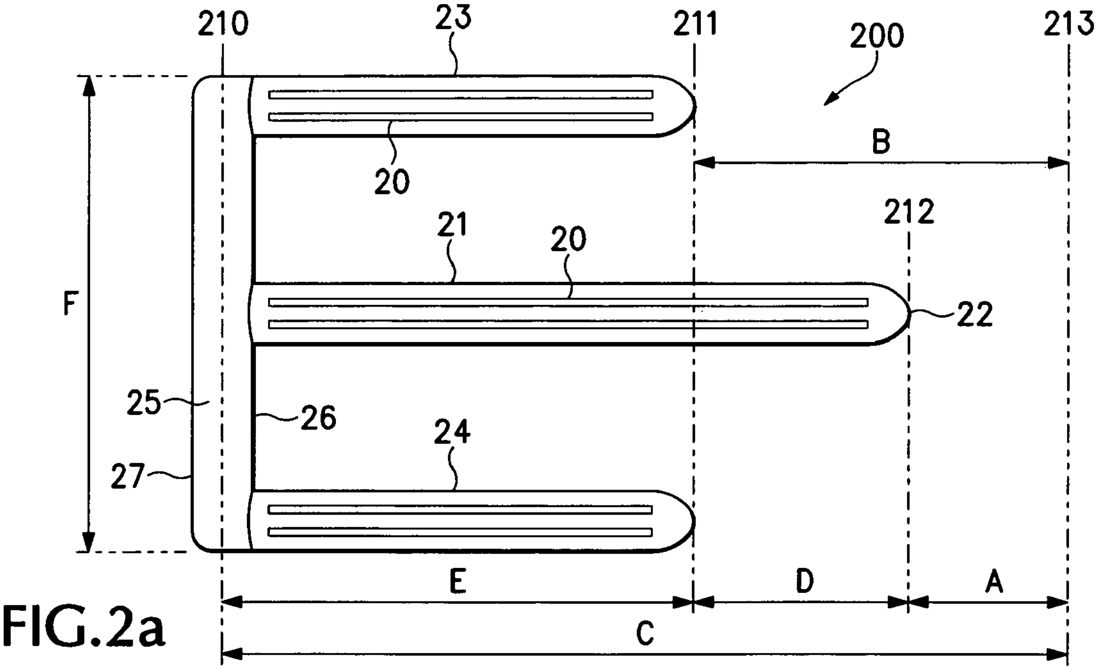
FIGS. 2*a-b* each depict a plan view of a DGM with one or more proximity indicating features according to an alternative embodiment of the invention.

The invented Detectable Guidance Markers additionally provide B/VI users with a substantial amount of information about the proximity of an obstacle, both relatively and progressively as the user approaches a marked obstacle. FIG. 2*a* depicts several proximity-indicating features of a contemplated DGM embodiment.

Line 213 represents the position of a leading edge of an obstacle (hereinafter obstacle 213) relative to DGM 200. Line 212 depicts the closest position that any portion of DGM 200 lies relative to obstacle 213, that closest portion being the proximal terminal end 22 of directional member 21. An 'exemplary' (in an embodiment) distance between line 212 and obstacle 213 is represented by 'A'. Likewise, line 211 represents a closest position of any portion of outer directional members 23/24 to obstacle 213, and an exemplary distance therebetween being represented by 'B'. Lastly, line 210 represents an exemplary position defined by a medial axis of base member 25, or alternatively, by either of a proximal edge 26 or distal edge 27 of base member 25, with an exemplary distance between line 210 and obstacle 213 being represented by 'C'. Additionally, 'D' represents an exemplary distance corresponding to the difference between distance 'A' and distance 'B', therefore also representing an exemplary difference between the respective lengths of directional members 21 and 23/24. Lastly, 'E' represents an exemplary distance between the position relative to the base member 25 represented by line 210, and the position represented by line 211, therefore also representing an exemplary length of at least one of members 23/24 relative to line 210.

As can be clearly seen, each of lines 210, 211, and 212 correspond to a proximity of a detectable feature of DGM 200 relative to obstacle 213. Therefore, a B/VI person tactually detecting and uniquely distinguishing any of the structural features of DGM 200 corresponding to one of lines 210, 211, or 212, and understanding a scheme or protocol of DGM placement uniformity within their navigational environment, will be able to determine relatively exactly how close they are to an exemplary leading edge of the marked obstacle 213. Such proximity determination is referred to herein as 'relative proximity', relative to the marked obstacle.

Additionally, if a B/VI person traversing DGM 200 first detects and uniquely distinguishes a DGM feature corresponding to either of lines 210 or 211, and proceeds to subsequently detect a feature corresponding to a more proximate line (e.g., 211 or 212), the B/VI person will be able to determine both 'progressive proximity' (e.g., that they are getting closer to obstacle 213), and also the relative proximity remaining between their position and an exemplary leading edge of obstacle 213.

Sighted persons take for granted the ability to determine such navigational information as progressive proximity and relative proximity to obstacles. Yet sighted persons continuously and subconsciously adjust their stride as they approach, for example, a bus stairway, so as to step onto the bus first with a preferred left or right foot, therefore demonstrating both capabilities. As the structure of the exemplary DGM 200 of FIG. 2 shows, the unique and integrated detectable features of DGM 200 provide this information to a B/VI person without resort to extrinsic environmental cues.

Stating that the described embodiments provide such information assumes, however, some degree of standardization in both the actual and relative dimensions of the various features and/or structures of DGMs, as well as standardization in their placement in an environment relative to marked obstacles. Therefore, the embodiments contemplate numerous dimensional and environmental placement alternatives that can provide both beneficial standardization and universal DGM interpretation.

In a preferred embodiment, a DGM 200 is configured so that each of distances 'A', 'B', and 'C' are proportionally related to one another, according to a predetermined scheme of obstacle-indicating indicia. For example, the DGM 200 is placed so that a proportional relationship between distances 'C', 'B', and 'A' is 6:3:1 in an embodiment. In one such embodiment, distance 'C' is six feet (6'), distance 'B' is 3 feet (3'), and distance 'C' is one foot (1'). Providing a first detectable feature at a relatively uniform and predictable (e.g., according to a predetermined scheme) distance of six feet (6') away from an exemplary leading edge of the obstacle establishes a known proximity baseline for a B/VI person.

Additionally, and perhaps even more useful for navigation, the B/VI user knows (through, for example, training, standardization of a placement scheme, etc.) that the relative proximities of each detectable proximity-indicating feature define a 3:2:1 relationship. That is, when positioned at the base member 25, as indicated by line 210, the B/VI user knows that a next detectable proximity-indicating feature will be found three feet (3') beyond the base member 25 in the correct direction of travel, at a position approximately corresponding to line 211. Subsequently, a next proximity-indicating feature, distal end 22, will be found approximately two feet (2') beyond the prior one, at line 212. Finally, the B/VI user knows that the obstacle will be found one foot (1') beyond the last proximity-indicating feature, proximal end 22 of dimensional member 21. Therefore, a relatively uniform distance of base member 25 from an obstacle, combined with a 3:2:1 relationship between progressively proximate proximity-indicating features, provides a B/VI with a plurality of integrated, tactually-detectable, informational indications, such as a sighted person would determine visually based on environmental cues when approaching an obstacle within a navigational environment or collectively-governed plurality of navigational environments (e.g., a city, a building, a state, etc.).

Of course, the dimensional relationships described above constitute only one example. One having ordinary skill in the art will recognize that nearly any dimensional relationship can be provided in any one DGM and/or any system of Detectable Guidance Markers. However, standardization and predictability are a hallmark of a system providing navigational information and guidance to B/VI persons, so a preferred embodiment of such systems will provide standardized dimensions (e.g., a uniform obstacle marking scheme, etc.) in both the configuration of individual DGMs, as well as in the placement of DGMs relative to obstacles.

Some obstacle types, due to safety or other considerations, may require that associated DGMs to be placed farther from the obstacle than is necessary and/or desirable at other obstacles. For example, it may be desirable to have no part of a DGM located any closer than three feet (3') from a train embarkation point, while it may be desirable to have a DGM for a crosswalk located no farther than one foot (1') from a curb entering the crosswalk. The differentiated patterns of various embodiments of DGMs enable a B/VI user to recognize each type of DGM, and therefore also readily recognize that the relative proximity relationships for the train embarkation DGM are, for example, 8:5:3, rather than 6:3:1 as for the crosswalk DGM. Even in a system embodiment wherein relative proximities are different from one type of obstacle-identifying DGM to another, standardization of DGM dimensions provides predictability for safe and confident navigation by B/VI persons.

Thus, the described features cooperate in embodiments to provide a B/VI user with clear and unambiguous information regarding the presence, direction, type, and proximity of a marked obstacle. For example, combined with directional members extending therefrom, base member 5 provides a detectable, direction-indicating reference structure. When detecting a DGM configured according to one or more of FIGS. 1*a*-1*d*, a B/VI user will easily and clearly understand that the DGM definitively and unambiguously indicates one and only one direction to a particular obstacle marked by the DGM. The user simply follows the one or more directional members away from the base member, and is guided directly to the marked obstacle. In other words, the base member 5 acts to foreclose any possible interpretation that a marked obstacle lies at the side of the DGM opposite the directional members, providing unmistakable directional guidance to the user.

Additionally, the directional members also provide directional indicia reinforcing the directional information provided by the base member 5. A B/VI user following the directional members in the proper direction, and first detecting three directional members (for example), and then detecting only one directional member continuing to extend beyond the others, will readily recognize that they are traveling in the proper direction relative to a marked obstacle. This knowledge is derived from knowing not only that the directional members 10 each terminate at the base member 5 at their distal ends 11, but knowing also that the directional members 10 are not all substantially identical to each other, in length for example. In particular, at least one directional member will differ from the others by the distance its proximal end 12 extends from the base member 5.

Although numerous dimensions and dimensional relationships are described above regarding the relative and/or overall lengths of the directional members 20, the width dimensions of each DGM and/or individual DGM structural feature are also worth noting. Referring to FIG. 2*a*, a minimum overall width F in a typical (but not exclusive) embodiment of a DGM pattern 200 disposed at a navigational substrate is approximately twenty-four inches (24"), although embodiments may also be narrower, while a preferred maximum width does not generally exceed a width of a typical sweep of a cane-device used for navigation by a B/VI person. A typically cane-sweep width can be found in the range of approximately three feet to six feet (3'-6'), but can be narrower or wider depending on such variable factors as the individual methods of use by users, a length of a cane, physical characteristics of a user, and other factors. As is discussed according to alternative embodiments, a width of a DGM pattern 200 can also be substantially wider or narrower. For example, when disposed at a surface of a vertical substrate for manual detection, a narrower DGM may be preferred.

Figure 2B:
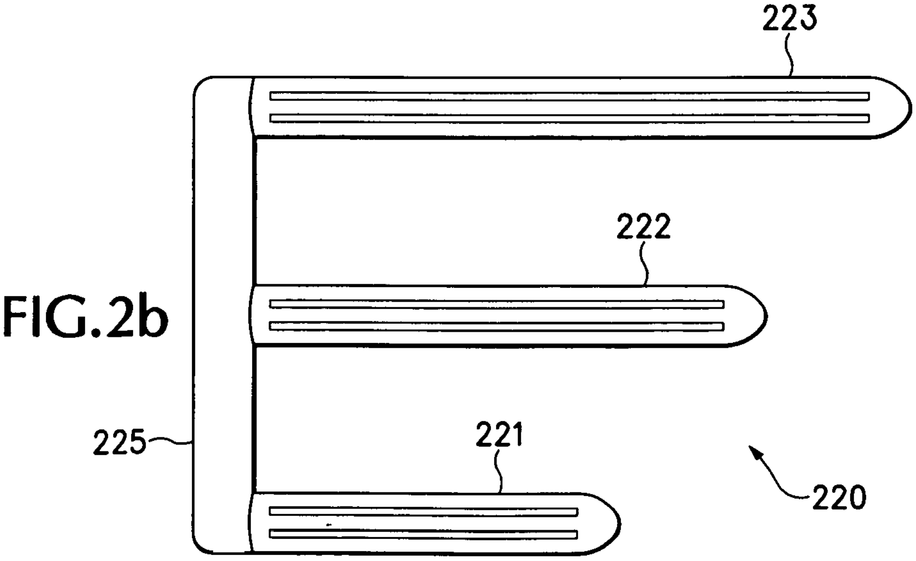

As FIG. 2*b* depicts, an alternative embodiment of a DGM 220 can including three or more directional members wherein each directional member has a different length relative to each other directional member, therefore providing a B/VI user with additional proximity-indicating features and information. For example, directional member 221 has a first length, directional member 222 has a second length which is longer than the first length of directional member 221, and directional member 223 has a third length which is longer than a length of either of directional members 221 or 222. Therefore, including base member 225, the DGM 220 of FIG. 2*b* provides at least four separate proximity-indicating features, while other DGM embodiments are contemplated which include even more proximity-indicting features.

FIG. 3 depicts a sectional end view, taken along line 3-3 of FIG. 1, of an individual directional member 30 of a DGM pattern 300, according to an embodiment. Directional member 30 typically has an overall width G of approximately three inches (3"), however, a width of one or more of the directional members 20 can be wider and/or narrower in alternative embodiments. Other dimensions according to a typical, although not exclusive embodiment, are discussed herein with regard to FIG. 3.

As shown in the sectional end view of FIG. 3, a directional member 30 typically comprises an elevated feature having a base 36 disposed adjacent to and securely coupled with a substrate 37, a relatively central apex 34, and two side portions 38 which each taper downwardly and outwardly from the apex 34, intersecting with the base at outer edges 39. Thus, herein, 'elevated' refers to any portion of a DGM member (e.g., directional, base, or other), such as the exemplary apex 34 in FIG. 3, which protrudes relative to (e.g., above, higher than, outwardly from, etc.) the surrounding substrate surface, and presents a tactually-detectable feature distinguishable therefrom.

As depicted in FIG. 3, base 36 is configured to engage a navigational substrate 37 in a relatively parallel-planar arrangement therewith, with such relativity being due in at least part to variations in roughness and contour of the base 36 and/or the substrate 37, variations due to manufacturing and/or placement tolerances, and other reasons as would be understood in the art. Therefore, in a typical but non-exclusive embodiment, a directional member 30 resembles a relatively flattened dome in sectional end view. In alternative contemplated embodiments, a sectional end view of a directional member 30 can resemble a relatively flattened triangle, rectangle, trapezoid, or other shape, whether symmetrical or asymmetrical.

A typical maximum height H of a highest point of the apex 34 above a surrounding surface of a substrate 37, and therefore the maximum height of a directional member 30 in a preferred but not exclusive embodiment, is approximately three-eighths of an inch (3/8"). This relatively modest height prevents a directional member 30 from presenting a trip hazard to pedestrians and B/VI persons, while at the same time being sufficiently elevated to provide tactile detectability. This preferred maximum height H does not, however, limit the contemplated embodiments. A directional member 30 having a higher maximum height at its apex may be provide beneficial tactual-detectability when disposed upon a particularly highly-textured substrate surface, for example, where B/VI users would also typically exercise more caution during walking, and therefore would be less likely to stumble over a more highly elevated DGM member.

With regard to the actual and/or relative dimensions of the various structural/informational members comprising DGM 300, a primary guiding principle is that the various members be easily detected and differentiated one from another so that a B/VI person can tactually recognize the structure of, and information conveyed by, the DGM 300.

As also shown in the depicted embodiment, a directional member 30 can further include one or more detectability-enhancing features 32 formed at a surface of one or more of the directional members 30 of a DGM, comprising either or both of a recessed portion (e.g., depression, trench, slot, etc.) recessed below a surrounding surface (whether such surface is curved or not), or an elevated portion (e.g., ridge, bump, fin, etc.) projecting above a surrounding surface (whether such surface is curved or not). Typically, although not exclusively, the one or more detectability-enhancing features 32 are linear, extending along at least a portion of the longitudinal length of a directional member 30 between a base member 25 and a proximal end 22 (with reference to FIG. 2*a*).

In the illustrative embodiment of FIG. 3, a 'depth' J of a recessed detectability-enhancing feature 32 extends approximately three-sixteenths of an inch (3/16") below a curved surrounding surface of the directional member 30, and is formed with an exemplary width K of approximately three-eights of an inch (3/8") at the surface of the directional member 30. Of course, while these measurements provide notably enhanced detectability of embodiments of the invented DGM 300, the embodiments are not so limited, and alternative embodiments may likewise obtain benefits from detectability-enhancing features 32 having somewhat larger and/or smaller dimensions.

As also depicted according to the embodiment of FIG. 3, the detectability-enhancing features 32 may generally be symmetrically located approximately mid-way between the apex 34 of a directional member 30 and each of an outer edge 39, such that the dimensions indicated as L and M are approximately equal (e.g., three-quarters of an inch, 3/4", each). However, the embodiments are not so limited, and alternative embodiments can include a single detectability-enhancing feature located at the apex 34, for example, or a plurality of detectability-enhancing features 32 non-symmetrically located relative to the apex 34 and/or one or more of the outer edges 39. Generally speaking, nearly any location and/or quantity of detectability-enhancing features 32 are contemplated as within the scope of the invention according to alternative embodiments, including the absence of such features.

According to at least one alternative embodiment, directional member(s) 30 includes one or more recesses 35 formed into the base 36 to receive an adhesive material 310 for adhesively coupling the DGM 300 with a 'suitable substrate' (which is any substrate that will accommodate secure affixation of a DGM, by any affixation means or method herein contemplated). Either of a recessed base 36 or a relatively planar base will generally include a roughened surface texture 305, enabling an adhesive material 310 disposed thereupon to obtain firm purchase and form a durable bond therewith, and to durably couple the DGM 300 with a substrate surface.

As described relative to a directional member 30, each of the dimensions and/or detectability-enhancing features 32 can also be found in the structural configuration of a base member of a DGM 300 and/or any other structural member of a DGM 300 described herein, and therefore should be considered equally applicable thereto in one or more embodiments of the invention.

Figure 4:
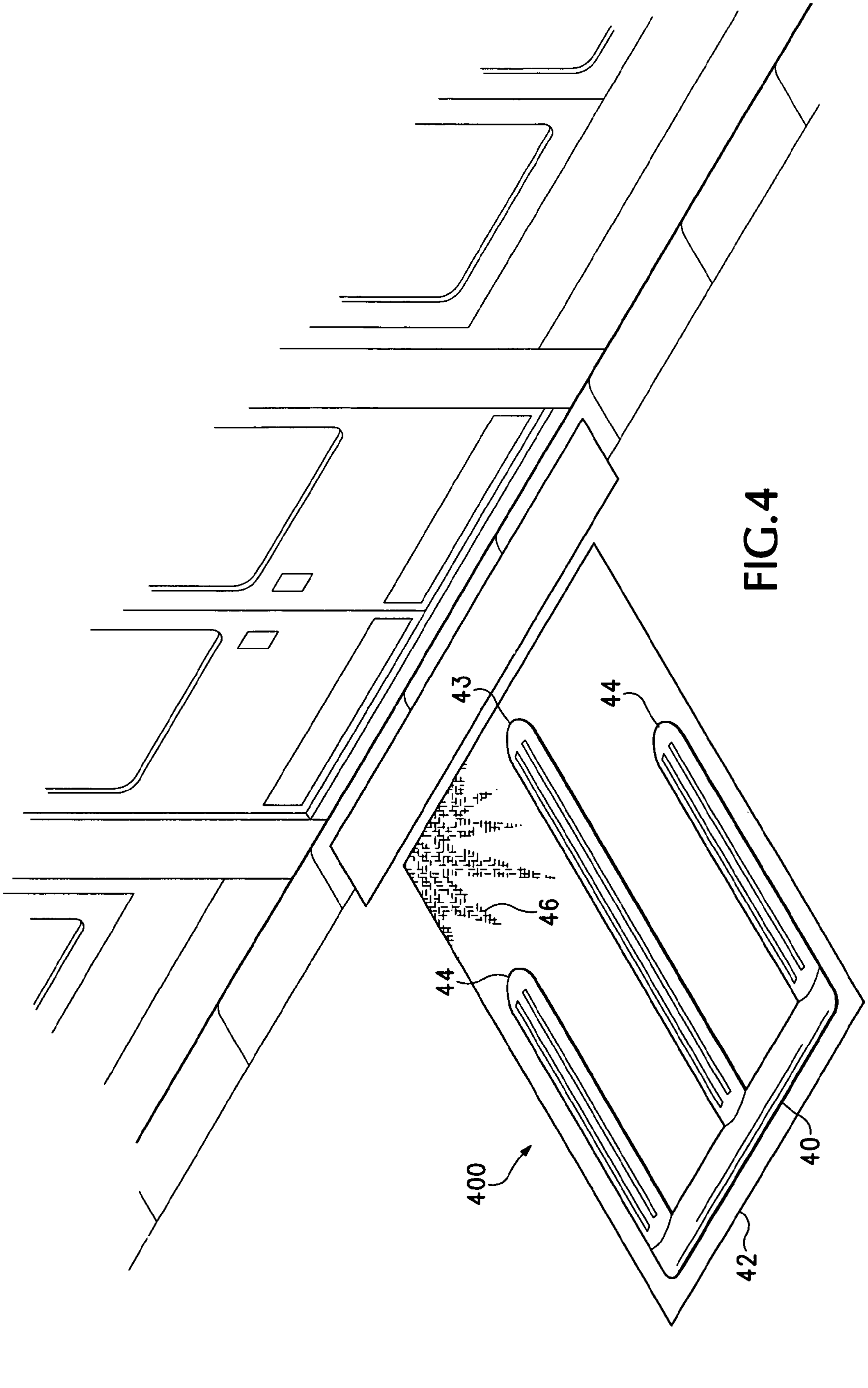
FIG. 4 depicts an isometric view of a DGM located proximate an environmental, navigational obstacle according to an embodiment of the invention.

FIG. 4 depicts a contemplated alternative embodiment of a DGM 400, where rather than the unitary structure consisting of a base member and one or more directional members being affixed directly with a substrate, the base member 40 and one or more directional members 43/44 are either coupled with or formed as detectable features at a surface of a relatively planar and/or flat panel member 42 ('DGM-bearing panel', or 'panel'). By 'relatively planar and/or flat', it is meant that the panel member is sufficiently planar and/or flat to not present a substantial trip hazard to ambulatory persons (e.g., protruding three-eighths of an inch (3/8") or less above a surrounding substrate surface) when disposed for use in an navigational environment, and to present a tactually-detectable difference between the panel member and a DGM pattern disposed thereupon.

Any or all of the panel member 42, the base member 40 and the one or more directional members 43/44, may be formed of (comprised of) a metal, rubber, stone (e.g., granite, etc.), ceramic, a durable polymer (e.g., plastic, PVC, etc.), or another suitable material and/or combination of materials. Suitable materials preferably possess one or more beneficial characteristics such as weather-resistance (e.g., water-resistance, etc.), wear-resistance, slip-resistance (e.g., whether wet or dry), resistance to exposure to ultraviolet radiation, thermal-resistance (e.g., resistant to thermal degradation, although not necessarily resistance to thermal transfer), and other beneficial properties, although this list is not intended to be exclusive. Thus, a 'suitable material' is preferably resistant to degradation due to wear and/or exposure to environmental elements and/or chemicals (degradation-resistant).

Of course, a DGM 400 disposed at an interior surface may not require the same material properties as one disposed at an exterior surface, but the materials selected according to alternative embodiments contemplate a full range of interior and exterior conditions, including extremes of weather, wear, and other factors capable of degrading the detectability and/or effective function of a DGM 400.

Panel member 42 can have a relatively rectangular, round, or alternatively-shaped periphery, and base member 40 and directional members 43/44 generally do not extend outwardly beyond a periphery of the panel member 42. A panel member 42 can also alternatively possess either a textured surface 46 (e.g., with either or both of recessed and elevated features) or a relatively smooth surface, however, the presence and configuration of DGM pattern (e.g., the base member and associated directional members) generally remains tactually detectable and identifiable despite a surface condition of a panel member 42 underlying and/or surrounding the DGM pattern.

A textured panel member surface 46 can be more highly textured (e.g., rougher, etc.) than a surrounding relatively smooth substrate surface, or a relatively smooth panel member surface 46 can be more smooth than a surrounding relatively more highly textured substrate surface, with the relative difference in surface smoothness and/or roughness providing a tactually-detectable indication that a DGM is present at that location relative to the substrate. Of course, in at least one embodiment, a panel member surface 46 can have textural characteristics substantially similar to those of a substrate surface with which the panel member 42 is coupled.

In alternative embodiments, a panel member 42 may be disposed adjacent to a substrate surface (e.g., overlying a substrate, etc.) with a lower surface of the panel member 42 lying in a relatively parallel-planar arrangement therewith. Alternatively, a panel member 42 may be partially and/or entirely recessed into a substrate surface. For example, when entirely recessed into a substrate surface, a panel member surface 46 at which a DGM pattern is disposed is approximately co-planar with one or more portion of the surrounding substrate surface.

Whether disposed atop a substrate surface or recessed into it, the DGM pattern-bearing panel member 42 is typically securely (and in some embodiments, securely yet detachably) coupled with the substrate. By 'securely', it is generally meant that reasonably expected use, environmental conditions, etc., do not typically cause the DGM to shift position relative to the navigational obstacle marked by the DGM, and/or to detach from the substrate surface.

For example, a panel member 42 may be adhesively coupled with the substrate surface (e.g., using any suitable adhesive material known in the art), or may be coupled therewith by one or more fastening means (e.g., bolts, concrete anchors, screws, pegs, clamps, pins, etc.), for example by passing at least partially through the panel member 42 and/or operatively engaging and retaining a portion of the periphery of the panel member 42. In at least one embodiment, a DGM-bearing panel member 42 has one or more structural features which engage one or more reciprocal features of the substrate and is/are retained by such engagement. The reciprocal feature(s) of the substrate may be formed by a liquid or semi-liquid substrate material (e.g., uncured cement) flowing over, into, or through the one or more structural features of the panel, and then curing to a rigid or semi-rigid state.

When disposed at a panel surface 46, a maximum height of an apex 34 of a directional member 43/44, etc., is typically measured from a surrounding surface of the panel rather than from a surface of the surrounding substrate, although the embodiments are not so limited, and the alternate (e.g., converse) situation is also contemplated. Therefore, the detectable structures of a DGM pattern are detectable relative to both of the panel surface and a surrounding substrate surface.

Figure 5:
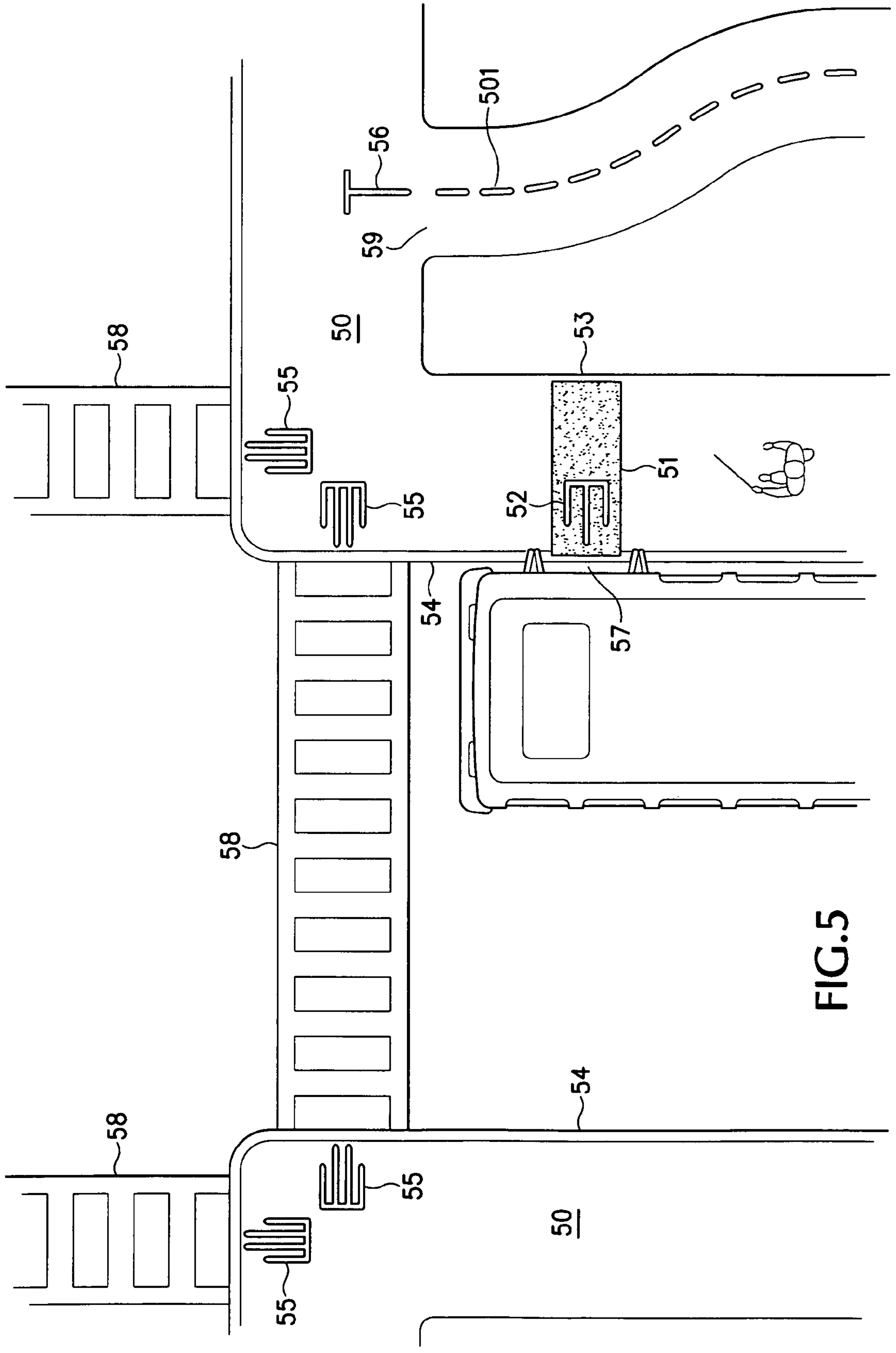
FIG. 5 depicts a plan view of an urban environment including DGMs according to alternative embodiments of the invention.

In at least one embodiment substantially depicted in FIG. 5, a defined area/portion 51 of the substrate surface surrounding or otherwise proximate to DGM 52, or some portion thereof, is either roughened or smoothed (texturally-altered) relative to a surface texture of the generally surrounding substrate surface 50. As described above, such defined texturally-altered portion 51 of the substrate surface 50 beneficially and detectably indicates the presence of a DGM 52 disposed within or proximate to the defined area of the texturally-altered substrate surface 51. In such embodiments, B/VI persons can more easily and readily become aware of the presence of (and perhaps even locate) a DGM 52 while still outside the outer dimensions of the DGM 52.

Therefore, a B/VI person is less likely to inadvertently navigate past a DGM 52 without gaining awareness of the same. This is particularly beneficial because walkways are frequently wider than the typical full sweep of a B/VI person's cane during normal use. Absent the described texturally-altered substrate surface 51, a B/VI person navigating near an inner edge of a walkway may not detect a DGM 52 disposed near an outer edge of the walkway where many obstacles (e.g., trees, newspaper dispensers, hydrants, etc.) may typically be located, and where a DGM 52 may be most beneficially disposed.

In an exemplary embodiment, a portion of a substrate surface having an altered surface texture 51 can extend fully across the substrate surface 50, for example a sidewalk, from a DGM 52 proximate a curb 54 to an opposing edge 53 of the sidewalk. Other DGMs 55/56 may be placed at the substrate surface 50 relatively proximate to a DGM 52 indicated by a texturally altered substrate surface 51, yet may or may not be likewise indicated by a texturally-altered substrate surface in alternative embodiments.

As also depicted by FIG. 5, an environment can include multiple embodiments of DGMs, comprising several alternative forms and intended to serve different purposes. For example, DGM 52, as is also substantially depicted in FIGS. 1*c*, 2*a*, and 4, is disposed at a substrate surface to indicate the presence, type, direction, and proximity of a transit stop 57 (e.g., bus stop, taxi stop, train stop, etc.). A width of the DGM 52 (e.g., the overall width, a longitudinal length of the base member, etc.) may correspond to (e.g., match, not exceed, etc.) the width of, for example, a doorway of a bus properly aligned with the transit stop 57, or with the width of the overall transit stop 57 within which a bus doorway will typically be found. Therefore, the DGM 52 can indicate to a B/VI user an approximate dimension of a marked obstacle.

Alternatively, DGM 55, also substantially depicted in FIG. 1*d*, can be disposed adjacent to and indicating an entry point to a crosswalk 58 across a street or other obstacle. Crosswalk 58 could also be an entrance to a bridge over a waterway or thoroughfare, an elevated sky-bridge connecting buildings over a thoroughfare, or another similar 'crosswalk' type structure and/or condition. Although each of DGMs 52 and 55 are depicted as being set back from a leading edge of an obstacle, a DGM can likewise be disposed relative to an obstacle such that there is little or no intervening lateral gap between a proximal end of an extended directional member and a leading edge portion of the obstacle. Thus, when a B/VI person detects the proximal end of the DGM, the person knows that they have arrived at the leading edge of the obstacle.

As with DGM 52, a center of DGM 55 (e.g., a longitudinal axis midway between and substantially parallel with each central directional member) is generally, but not exclusively, aligned with a longitudinally pathway located centrally within and parallel to crosswalk 58, such that the center of DGM 55 indicates to a B/VI person the location of the center of the crosswalk 58.

A general purpose DGM 56, as depicted in FIG. 1*a*, can be used to mark navigational pathways in a great number of situations, and is easily distinguished from DGMs 52 and 55 by its single directional member rather than plural directional members. For example, DGM 56 can be used to indicate an entry point 59 to a path through a park, or some other navigational divergence from a walkway. Additionally, DGM 56 can be disposed so that its directional member aligns with one or more substantially linearly-arranged pathway markers 501, thus providing a means to lead a B/VI person from a general purpose walking surface to a more specialized walkway according to any of a great number of situations, whether such walkways are also tactually marked as at 501 in FIG. 5 or not so marked.

Figure 6:
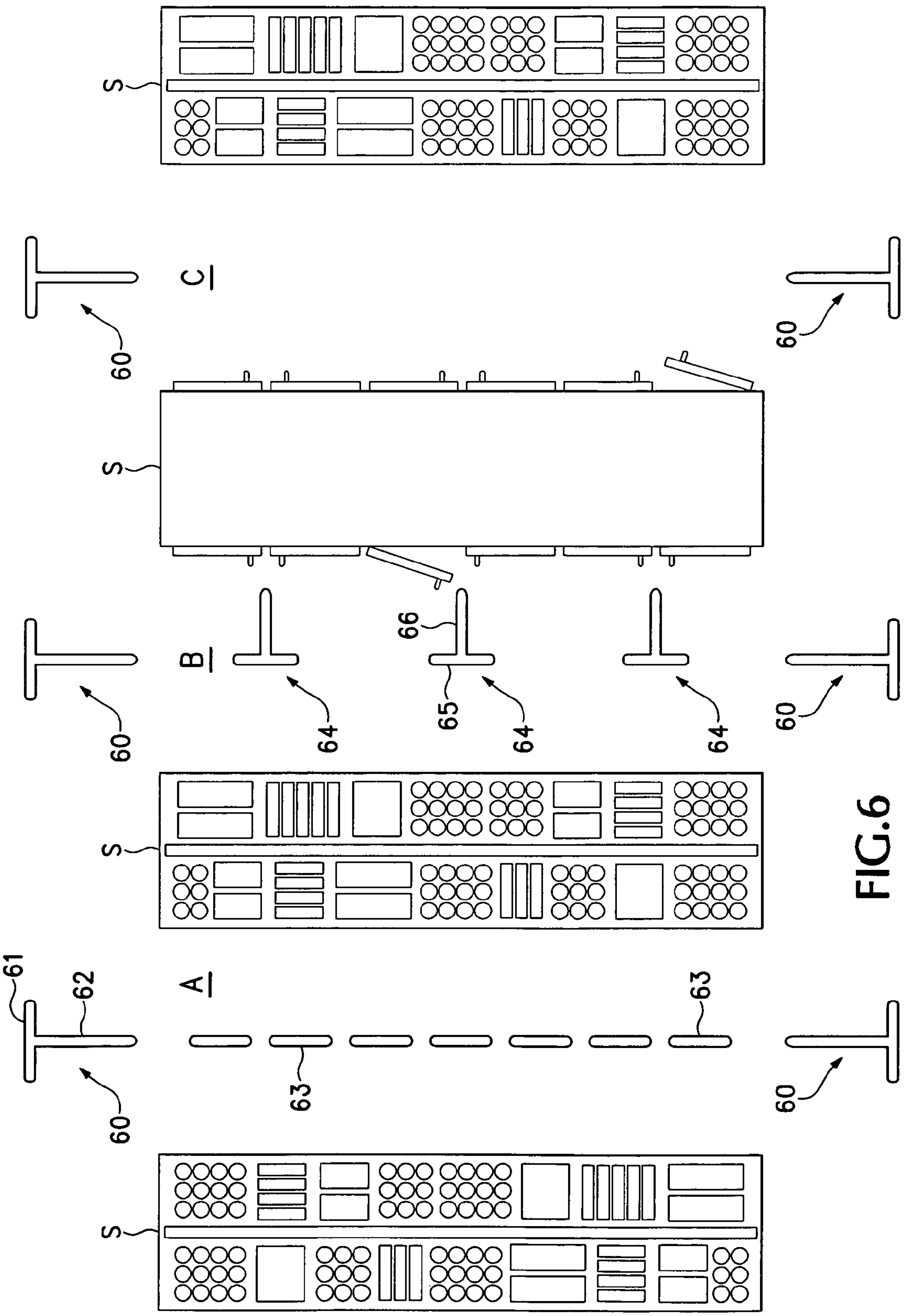
FIG. 6 depicts a plan view of a building interior including DGMs disposed as general purpose guidance markers according to an embodiment of the invention.

For example, FIG. 6 depicts a plan view of an interior environment, such as in a commercial establishment, where commercial goods are placed upon shelves S disposed in a relatively parallel arrangement (as shown), and with aisles A-C defined between adjacently disposed shelves S. As can be seen, a typical but not exclusive embodiment includes a general purpose DGM 60 placed at one or more ends of an aisle, with the directional member(s) 62 disposed parallel to and generally aligned with a longitudinal center of the aisle. In this arrangement, the base member 61 of each DGM 60 lies perpendicularly relative to the longitudinal center of each aisle, indicating a proximity to a beginning point of each corresponding aisle.

As shown with regard to Aisle 'A', the directional members 62 of the general purpose DGMs 60 disposed at opposing ends of Aisle 'A' align longitudinally with, and tactually guide a B/VI person to, a relatively linear arrangement of detectable markers 63 disposed along the center line of Aisle 'A'. In this embodiment, the base member 61 of one DGM 60 informs a B/VI user of the presence of Aisle 'A', as well as a proximity to the entry point to the aisle. Upon arriving at the opposing end of Aisle 'A', the base member 61 of the opposing (exit-marking) DGM 60 informs the B/VI user that they have exited Aisle 'A', and also helps to align the B/VI user's subsequent direction of travel perpendicular to Aisle 'A'.

Additionally, the base member 61 of the exit-marking DGM 60 also aligns the B/VI user with the entry-marking DGM 60 of an adjacent aisle, such as Aisle 'B', enabling rapid location of the next sequentially navigated DGM 60 and Aisle 'B' by the B/VI user. In this way, the structurally integral directional members 62 and base members 61 in embodiments of the invented DGMs cooperate with DGMs disposed at adjacent walkways, and at opposing ends of walkways, to provide useful guidance information to B/VI users.

Alternatively, as shown in FIG. 6 with regard to Aisle 'B', rather than simply a sequential, linear arrangement of relatively elongate pathway markers, as shown in Aisle 'A' at 63, a sequential arrangement of general purpose DGM markers 64 provides additional guidance and directional information to a B/VI user. For example, once the B/VI user locates a relatively longitudinal center of Aisle 'B' by utilizing a directional member 62 of a DGM 60 at an entry end of the aisle, the user can then navigate Aisle 'B' using the sequential, relatively linearly-aligned base members 65 of DGMs 64 disposed along the length of Aisle 'B'.

Additionally, each DGM 64 disposed within Aisle 'B' can further include a directional member 66 positioned to indicate a location of an obstacle, such as a door of a freezer unit disposed within a merchandise shelf unit. Upon locating and retrieving a desired item from the freezer unit, the B/VI user can easily return to their path and continue along the aisle by following the directional member 66 back to the base member 65, then following the sequence of base members 65 along the plurality of DGMs 64 until reaching the DGM 60 disposed at and indicating the end of Aisle 'B'. Of course, in an alternative embodiment, the DGMs 64 as depicted in Aisle 'B' can be interspersed with linear markers such as those depicted in Aisle 'A', such as when relatively few obstacles may be present and marked by widely-separated general purpose DGMs 64 in a relatively long aisle.

From this description and the embodiments depicted at FIG. 6, one having ordinary skill in the art will readily recognize the cooperative functional relationship in a DGM between a base member and the one or more directional members integrally formed therewith.

As shown according to Aisle 'C', however, general purpose DGMs 60 can also bracket an aisle in the absence of any intermediately placed navigational markings, and yet provide similar benefits. In such situations, a B/VI person may navigate the length of an aisle by simply contacting and detecting each shelf through relatively sequential sweeps of a cane or similar device as they proceed down the aisle, until finally detecting the exit-marking DGM 60 at an end opposing the initial entry point into the aisle. Therefore, while this description and the embodiments of FIG. 6 provide several embodiments in which general purpose DGMs provide benefits to B/VI users navigating an environment, the contemplated embodiments are not so limited. Rather, the contemplated embodiments include a great number of environmental obstacles, pathways, and situations wherein cooperating base members and directional members of one or more general purpose DGMs provide navigational information including obstacle presence, dimensions, identification, direction, and/or proximity.

While one means has been described for indicating the presence of a DGM disposed at a substrate surface, such as altering the texture of the substrate surface in a defined area proximate to a DGM relative to a surrounding substrate surface texture (see 51 in FIG. 5), the embodiments also contemplate alternative DGM presence indicating means.

Figure 7:
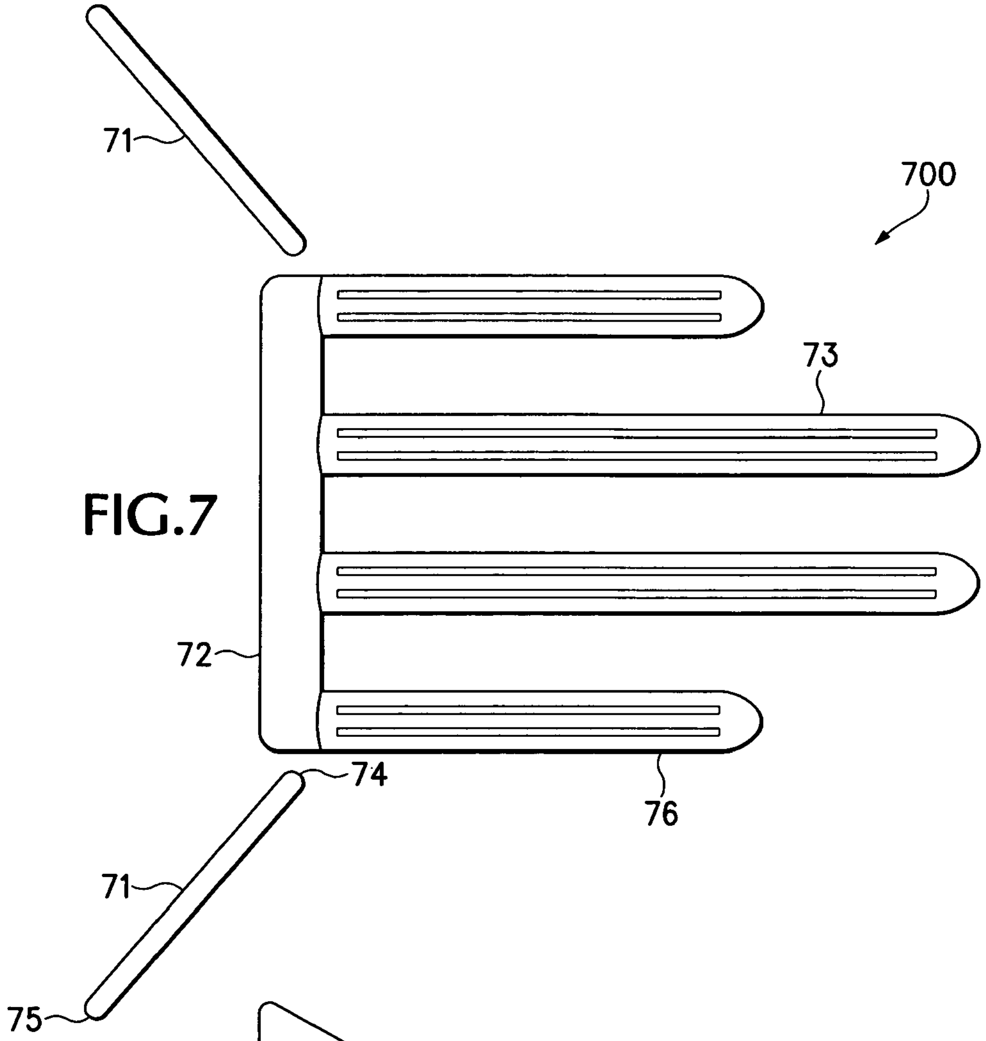
FIG. 7 depicts a plan view of a DGM including peripheral locating members provided according to an alternative embodiment of the invention.

Referring to FIG. 7, a DGM 700 includes detectable accessory members 71 ('peripheral locating members' 71), typically but not exclusively disposed at one or more angles relative to the perpendicular base member 72 and directional members 73/76 of the DGM 700. Peripheral locating members 71 may also lie generally at angles to a typical direction of travel of persons along or relative to a walkway upon which the DGM 700 is disposed. A function of peripheral locating members 71 is to extend outward from the generally outer dimensions of DGM 700, and at least in part due to their angularity, to guide a B/VI person inward toward the main information-providing structures of the DGM 700.

To this end, each of the one or more peripheral locating members 71 disposed at or formed into a substrate surface are configured to be detectable to a B/VI person, for example, in one or more of the same ways as are the base member 72 and/or the one or more directional members 73/76. For example, the cross-sectional configuration of peripheral locating members 71 can share any or all of the same and/or similar dimensions, shape, substrate-attachment features, etc., as shown in FIG. 3 or otherwise described herein relative to directional members 73/76. Accordingly, a peripheral locating member 71 can be disposed as an structure elevated above a surrounding substrate surface, or can alternatively be formed as a recess below a surrounding substrate surface. Likewise, a peripheral locating member 71 can include detectability-enhancing features formed upon, along, and/or into a surrounding surface of the peripheral locating member 71, similar to those shown at 32 in FIG. 3.

In an embodiment, an end of a peripheral locating member 74 proximate a DGM 700 is disposed at, and either coupled with or angularly and outwardly separate from an approximate junction of a base member 72 and an outer directional member 76, substantially as shown in FIG. 7. An opposing end 75 of the peripheral locating member 71 is disposed outwardly from the DGM 700, as also substantially depicted in FIG. 7. In such an arrangement, the one or more peripheral locating members 71 extend a detectable range of a DGM 700 outwardly beyond the dimensions of the main integral, informational members of the DGM 700 (e.g., the base 72 and directional 73/76 members).

In the case of a general purpose DGM having only one, relatively centrally-located directional member, or any other embodiment not having a directional member intersecting a base member at one or another end of the base member, an end of a peripheral locating member(s) 71 lying proximate the DGM 700 will be positioned proximate an end of the base member 72 as if an outer directional member 76 was present and coupled thereat.

Additionally, as mentioned, the detection of an angular arrangement of peripheral locating members 71 by a B/VI person tends to cause such persons to navigate inwardly toward the informational members of the DGM 700. This is true from each of the three directions relative to a DGM 700 from which a person may typically encounter an obstacle. Thus, the DGM 700 can be said to affect the surrounding substrate surface by extending detectable features outwardly from the DGM 700, materially enhancing the detectability and ease of location of a DGM 700 by a B/VI person.

Inasmuch as peripheral locating members 71 can be coupled with either or both of a base member 72 and an outer directional member 76, or can alternatively be separate therefrom, directional members can either be considered part of an overall DGM 700 structure, or can be considered ancillary structures, separate from but related to the DGM 700.

Alternative Embodiments

According to at least one alternative embodiment, one or more separate structural members may be joined together for form a unitary DGM structure, according to an embodiment described herein or otherwise contemplated. A separate structural member can comprise any or all of a base member and/or a directional member of a DGM, but are not so limited. When disposed upon a substrate, or before, such plurality of separate structural members can be assembled to form a unitary DGM. Thus, the embodiments are not limited to DGMs originally formed (such as by injection molding, punching, etc. etc.) to integrally include a base member and all directional members, (e.g., manufactured as a single unitary structure), but can include individual members (e.g., directional, base, etc.) formed by extrusion, for example, and later assembled to form a unitary DGM.

At least one embodiment contemplates a DGM formed of and/or into a substrate and/or panel as a recessed structure disposed below a surrounding surface thereof. Herein, 'recessed' refers to any portion of a DGM member (e.g., directional, base, or other), disposed below (e.g., formed into, lower than, imprinted into, etc.) the surrounding substrate surface, and presents a tactually-detectable feature distinguishable therefrom.

In such embodiments, the actual and/or relative dimensions of one or more of the base member and/or directional members can be inverse equivalents of those present in a typical elevated DGM structure (e.g., an approximate three-eights inch (3/8") maximum depth rather than apex height, etc). Likewise, in embodiments of a DGM recessed into a substrate, the 'base' of the DGM would be considered to be co-planar with the surrounding surface of the substrate having a planar surface. Of course, the invention also encompass embodiments of a DGM having at least one portion recessed below the surrounding surface of a substrate, and at least another portion having a profile elevated above the surrounding surface of the substrate, as would be understood from this description by one having skill in the art.

In at least one embodiment, a DGM pattern is integrally formed from the same material as the substrate itself. For example, a concrete mold can be used in an embodiment to form a DGM composed of concrete, either elevated relative to a surrounding surface of the substrate, or recessed below the surrounding surface of the substrate, or any combination thereof. Such integral formation may take place at the same time that the substrate is formed, or may be formed at a later time by, for example, mechanical, chemical, sonic, laser and/or other material removal techniques.

In at least one alternative embodiment, a DGM is configured for disposing at a vertical surface, such as that of a wall, door, signboard, or other structure. When so disposed, the detectible features of the DGM can be as described similarly to any of the embodiments presented above. Alternatively, disposing at a vertical surface enables manual detection and perception of a DGM, and because hands generally can discern smaller and/or more complex structures, embodiments having alternative configurations are contemplated within the scope of the invention.

Figure 8:
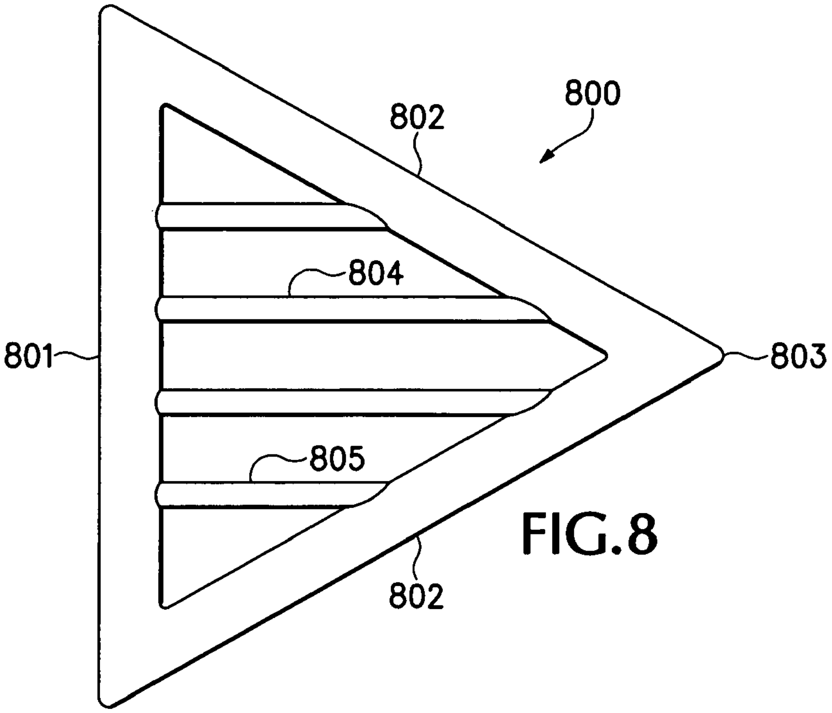
FIG. 8 depicts an elevation view of an alternative DGM disposed at a vertical surface according to an embodiment of the invention.

FIG. 8 depicts at least one alternative embodiment of a vertically disposed DGM 800, which can provide directional information to both sighted and B/VI persons. DGM 800 includes a base member 801 configured to foreclose a direction of travel, and may also include one or more 'supplemental directional members' 802 configured to form a direction indicating shape (e.g., a triangle, an arrow, an arc, etc.), whether individually or in association with the other members of the DGM. Relative to the base member 801, the apex 803 formed by the converging supplemental directional members 802 may be easily recognized as a direction-indicating marker to both sighted and B/VI persons.

In addition to, or even in the absence of supplemental directional members 802, directional members 804/805 coupled at a distal end with the base member 801 and including proximal ends extending in a direction of an obstacle, provide directional and identification information similarly to the embodiments described above. For example, a number of directional members 804/805 can correspond to a type of indicated obstacle, and one or more directional members 804 having a greater length than one or more other directional members 805 can reinforce the directional indication provided by the base member 801.

A DGM 800 configured for manual detection and 'reading' at a vertical surface will typically (but not necessarily) be smaller in size than a DGM placed at a horizontal substrate surface (e.g., walkway). For example, a maximum length of the base member 801 in a preferred embodiment may typically be found within the range of approximately eight to twenty inches (8"-20"), but the embodiments are not so limited, and can also be substantially larger and/or somewhat smaller. Similarly, the widths of one or more of the base member 801, supplemental directional members 802, and/or directional members 804 can be found within a range of approximately one-eighth inch to two inches (1/8"-2") in a preferred embodiment, but are not so limited, and can likewise be wider and/or narrower.

Inasmuch as a vertically disposed DGM does not present a trip hazard to pedestrians and others, one or more informational members of DGM 800 can extend above (e.g., extend outward perpendicularly relative to) a surrounding substrate surface (at which they are disposed) by an amount found within the range of approximately one-eighth to one-half inch (1/8"-1/2") in a preferred embodiment. The contemplated embodiments are not, however, so limited, and can be found outside either end of the described range.

With regard to the actual and/or relative dimensions of the various structural/informational members comprising DGM 800, a primary guiding principle is that they be easily detected and differentiated one from another so that a B/VI person can tactually recognize the structure of, and information conveyed by, the DGM 800.

Because any of the described DGMs embodiments may provided directional and/or informational benefits to sighted persons as well as B/VI persons, the embodiments also contemplate DGMs possessing distinctly and/or differentially colored structural features, wherein color further supplements the detectability and/or information conveying capability of a DGM. For example, a visibly-contrasting and/or visibly-colored (e.g., orange, yellow, etc.) DGM disposed at a transit stop can provide benefits to a transit vehicle operator for stopping a vehicle at a proper position for easy and unobstructed entry by passengers. Differential DGM coloring between alternative embodiments can likewise inform a fully and/or partially sighted user as to the identity of an obstacle.

In yet another beneficial embodiment, any of the described DGM embodiments can include non-tactile detection elements (herein, 'supplemental detection aids'), whether passive or active in nature. Such non-tactile detection elements can cooperate with a functional feature, device, or material of a navigational device (e.g., a cane, a wheelchair, a walker, etc.) to convey to a B/VI user at least a portion of the informational content embodied in a DGM.

For example, the informational members (e.g., directional, base, etc.) of a DGM can include an embedded magnetic and/or magnetized (alternatively or collectively herein, 'magnetically active') material extending substantially the full length of the directional member, as show at 315 in cross-sectional view in FIG. 3. A B/VI user can further have an apparatus included as a part of their cane, wherein the apparatus is configured to detect the presence of either of the magnetically active material present in an informational member when a portion of the cane is positioned closely relative to the informational member. Additionally, upon such detection, the apparatus can be configured to produce one or more of an audible and/or other user-detectable indication to the user. By passing the cane-over the informational members of a DGM so configured, the user can determine a direction to an obstacle, a type of obstacle, a proximity to the obstacle, and/or a plurality of other information, all without directly contacting and tactually sensing and/or evaluating the DGM.

Alternatively, a DGM can include electromagnetically reflective elements (e.g., operative with electromagnetic energy either or both of within or outside the visible spectrum) in the base and/or directional members as a supplemental detection aid. A correspondingly equipped navigational device (e.g., cane, etc.) can emit a pulse and/or beam of light, for example, from an integral light source down upon the DGM. Based upon differential levels of light reflection of a substrate surface relative to the informational members of a DGM, or of the informational members relative to a surface of a panel upon which the base/directional members are disposed, for example, the navigational device can produce one or more user-detectable and/or decipherable indications (e.g., vibration, an audible signal, etc.) sufficient to convey relevant information to the user. Of course, electromagnetic energy outside the visible spectrum can likewise be utilized, including but not limited to infrared and/or ultraviolet wavelengths.

In yet another embodiment, rather than (or in addition to) altering a surface texture of a substrate surface proximate to a DGM, a radio-frequency identification (RFID) device configured to emit and/or respond to a RFID signal can be integrally included within a DGM, integrated into the substrate at which a DGM is disposed, or otherwise disposed proximate to a DGM. A B/VI user's navigational device can be correspondingly configured with a RFID signal emitter and/or receiver configured to detect and identify an RFID signal emitted from a DGM, and to identify the type of obstacle marked thereby. When a cane and/or other navigational device so equipped enters within a sufficiently close proximity to a cooperatively configured DGM such that a received RFID signal exceeds a detectability threshold, detection of the DGM is achieved. Upon such detection, and sufficiently to convey the detection, proximity, identification and/or other information to the user, the navigational device will produce one or more user-detectable indications of such information. Thus, an RFID device constitutes at least a third form of supplemental detection aid according to an embodiment.

Advantages of the Invented System Embodiments over the Prior Art

The presence of a base member integrally-coupled with one or more directional members in a unitary DGM according to the numerous embodiments, provides important and valuable advantages over prior art devices and systems. First, a base member provides a detectable, direction-indicating reference structure. When detecting a DGM according to one or more of the embodiments described herein, a B/VI user will easily and clearly understand that the DGM definitively and unambiguously indicates that a marked obstacle lies in one and only one direction relative to the DGM. The user simply follows the one or more directional members away from the base member, and is guided directly to the marked obstacle.

Further a B/VI user can understand such unidirectional indication without resorting to extrinsic environmental cues. All or substantially all necessary navigational information is incorporated into each individual DGM, consistently provided to a B/VI person substantially without respect to such variable factors as time of day (e.g., variable amounts of vehicular/pedestrian traffic, changing environmental obstacles, etc.), location, the changing conditions of extrinsic cues, etc. Therefore, the directional ambiguities and deficiencies inherent in prior art solutions are eliminated by the DGM embodiments described and contemplated herein.

Additionally, the cooperating and integrated base member and directional members having different lengths in embodiments, provide a plurality of tactually-detectable, proximity-indicating features, enabling a B/VI user to not only understand the direction to an obstacle, but also their relative and/or progressively changing proximity to the obstacle. Such proximity-indicating features can further be supplemented and/or altered in embodiments by including or excluding a distance between an obstacle and a most-closely disposed proximal end of a dimensional member, by altering the actual and/or relative lengths of directional members and thereby potentially altering the distance of a base member from the obstacle, or by differentially-sizing (e.g., length) more or fewer of the directional members, as described above. Thus, the various embodiments wherein proximity information is provided to a B/VI user are exceedingly numerous.

Embodiments of the invention also include those in which a surface texture of a substrate surface in an defined area (e.g., a defined shape and/or limited expanse) surrounding or otherwise proximate to a DGM is altered, either by smoothing or roughening the substrate surface relative to a surface texture of the surrounding substrate. In such embodiments, the texturally-altered substrate surface extends beyond the dimensions of a DGM, signaling the presence of a DGM to a B/VI user who might otherwise inadvertently pass by the DGM and obstacle without obtaining awareness thereof.

In still other embodiments, a DGM can include detectable, ancillary peripheral locating members extending at angles outwardly from the main, integral, informational (e.g., base and directional) members of the DGM. Such ancillary members provide advantages by directing passing B/VI users inwardly toward the DGM from one or more directions of approach, likewise preventing B/VI users from inadvertently passing by without gaining awareness of the DGM or the marked obstacle. Either or both of a texturally-altered substrate surface and/or one or more peripheral locating members extending outwardly from a DGM, can be considered to affect a substrate surface surrounding a DGM.

Embodiments also provide advantages by integrating active and/or passive elements (e.g., magnetic, RFID, etc.) with informational elements (e.g., base member, directional member, etc.) of a DGM. Such elements can interact with a B/VI person's correspondingly-configured navigational device to generate a user-detectable response (e.g., audio, vibratory, etc.) when the navigational device arrives within an operative proximity to a DGM, and/or is passed over informational elements of a DGM. Therefore, a DGM can enable not only tactually-detectable information, but also one or both of non-tactually detectable information, and/or secondary tactile information through such means and/or methods as causing a navigational device held in contact with a B/VI person to emit a physically-detectable response (e.g., vibrating, etc.). Thus, the embodiments contemplate advantages in aiding B/VI persons to locate DGMs, as well as conveying DGM information via numerous user-detectable means and/or methods.

While numerous embodiments contemplate one or more of the directional members being integrally coupled with the base member, alternative embodiments (e.g. wherein one or more of the directional members are disposed proximate to but not in direct contact with the base member) are also contemplated within the scope of the invention. Likewise, while one or more directional members extend at a relatively perpendicular angle (e.g., within plus or minus five (5) degrees from perpendicular) from and relative to a common base member in a typical embodiment, the scope of the invention also contemplates embodiments having one or more directional members extending from the common base member at a non-perpendicular angle.

While several advantages are listed here, one having skill in the art will recognize that the invented apparatus, system, and method, according to its many and varied embodiments, provides additional advantages neither found within nor derived from the prior art.

It will be further understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the term ‘may’ used herein (e.g., ‘may have’, ‘may be’, etc.) is not intended to convey uncertainty, but rather is used to indicate that the described and feature, capability, function, structure, or other aspect of the invention is contemplated according to an alternative embodiment. Likewise, the term ‘exemplary’ herein typically indicates a structure, condition, arrangement, dimension, feature, etc. according to an embodiment of the invention, and does not necessarily indicate that such embodiment is a sole or preferred embodiment.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A unitary navigational-indicia-bearing apparatus configured for tactile detection, comprising:

a unitary arrangement of tactually-detectable elongate members disposed at a navigational substrate surface proximate to a navigational obstacle, wherein a terminal end of a second elongate member adjoins a first elongate member, wherein the second elongate member extends perpendicularly away from the first elongate member and toward the navigational obstacle, and wherein the length of the second elongate member and the disposition of the arrangement of tactually-detectable elongate members on the substrate surface are collectively configured to indicate to a user of the apparatus both the direction and the proximity of the user to the navigational obstacle.

2. A tactually-detectable guidance marker (DGM) apparatus configured to be disposed at a surface of a navigational substrate, comprising:

an elongate base member; and plural parallel elongate directional members each including a first end, a second end, the plural elongate directional members each extending from the base member at a relatively perpendicular angle and in a first direction relative thereto, the first ends of the plural directional members adjoining and abutting the base member and being distributed along a length of the base member and forming a unitary structure therewith, the second ends of the plural directional members extending in a common direction outwardly from the base member, wherein the base member and each of the plural directional members includes portions configured to possess, when disposed at the navigational substrate surface, a tactually-detectable profile relative to the navigational substrate surface.

3. The DGM apparatus of claim 2, wherein at least one of the plurality of directional members has a first length, and at least another of the plurality of directional members has a second length that is tactually-detectably different from the first length.

4. The DGM apparatus of claim 3, wherein each of the first length and the second length is configured to indicate a unique distance relative to a navigational obstacle when the DGM is disposed at a substrate surface.

5. The DGM apparatus of claim 2, wherein either or both of the base member and the directional member include either or both of elevated and recessed detectability-enhancing features disposed thereupon.

6. The DGM apparatus of claim 2, further comprising;

a panel member comprised of a suitable material, wherein the DGM is disposed at a surface-of the panel member.

7. The DGM apparatus of claim 2, further comprising:

one or more peripheral locating members configured to be disposed at and securely coupled with a navigational substi ate surface, adjacent to and outwardly extending relative to the unitary base and directional members, and further configured to tactually affect the navigational substrate surface surrounding the DGM.

8. The DGM apparatus of claim 2, further comprising:

one or more supplemental detection aids coupled with the DGM and selected from the group consisting of a magnetically active material, an electromagnetically reflective material, and a radio-frequency identification device (RFID).

9. A method for deploying a detectable guidance marker (DGM) in a navigational environment, the method comprising:

disposing a unitary, tactually-detectable DGM structure at a navigational substrate surface proximate to a navigational obstacle, the DGM structure comprising:

an elongate base member; and an elongate directional member including a first end adjoining the base member, the elongate directional member extending from the base member at a relatively perpendicular angle and in a first direction relative thereto; and coupling the DGM securely with the navigational substrate in such manner that the navigational obstacle is found in the first direction relative to the DGM.

10. The method of claim 9, wherein each of the base member and the directional member includes portions configured to possess, when disposed at the navigational substrate surface, a tactually-detectable profile relative to the navigational substrate surface surrounding the DGM.

11. The method of claim 9, wherein the elongate directional member is one of a plurality of parallel elongate directional members each including a first end and a second end, the first ends thereof adjoining the base member and the second ends thereof extending in a common direction outwardly from the base member.

12. The method of claim 11, wherein at least one of the plurality of directional members has a first length, and at least another of the plurality of directional members has a second length that is tactually-detectably different from the first length.

13. The method of claim 12, wherein disposing the DGM at a navigational substrate proximate to a navigational obstacle further comprises:

disposing the DGM at a predetermined distance from the obstacle such that the first length tactually indicates a first distance relative to the obstacle, and the second length tactually indicates a second distance relative to the obstacle.

14. The method of claim 11, wherein a quantity of the plurality of parallel elongate directional members corresponds to a type of navigational obstacle indicated by the DGM.

15. The method of claim 11, wherein the DGM further comprises:

providing a relatively flat panel member, wherein the base member and the plurality of parallel elongate directional members are disposed at a first surface of the panel member orientated to enable tactual detection, and an opposing second surface of the panel member coupled with the navigational substrate.

16. A system for providing navigational indicia using a detectable guidance marker (DGM), comprising:

a base member disposed at a navigational substrate surface, proximate to and at a predetermined distance from a navigational obstacle;

a plurality of directional members likewise disposed at the navigational substrate surface, each of the plurality of directional members adjoined at a first end thereof with the base member and terminating separately and spaced apart from the others of the one or more directional members at a second end thereof and extending relatively perpendicularly therefrom and toward the navigational obstacle over a defined length that is tactually-detectably indicative of the DGM's proximity to the navigational obstacle, wherein each of the base member and the plurality of directional members includes portions configured, when disposed at the navigational substrate surface, with a tactually-detectable profile relative the navigational substrate surface; and one or more navigational-obstacle-related indicia embodied in a structural configuration of one or more of the base member and the plurality of directional members according to a predetermined scheme.

17. The system of claim 16, wherein indicia are selected from a group consisting of 1) a first length of at least one directional member relative to a second length of at least another directional member that is tactually-detectably different from the first length, 2) a predetermined distance of the base member from an indicated navigational obstacle, 3) an overall width of the DGM, 4) a quantity of the plurality of directional members, and 5) a direction in which the plurality of directional members extend from the base member.

18. The system of claim 16, further comprising:

a defined area of texturally-altered navigational substrate surface surrounding at least a portion of the DGM, wherein the altered texture is tactually-distinct relative to a generally surrounding navigational substrate surface.

19. The system of claim 16, further comprising: one or more supplemental detection aids structurally incorporated with the DGM and configured to interact with a cooperatively configured navigational device, the one or more supplemental detection aids being selected from the group consisting of an electromagnetically reflective material operative to reflect visible- or near-visible light and a radio-frequency identification device (RFID).

* * * * *